United States Patent [19]

Brooks

[11] Patent Number: 5,146,358
[45] Date of Patent: Sep. 8, 1992

[54] OPTICAL COMMUNICATIONS SYSTEM AND METHOD FOR TRANSMITTING INFORMATION THROUGH A SINGLE OPTICAL WAVEGUIDE

[75] Inventor: William M. Brooks, Scotts Valley, Calif.

[73] Assignee: PYR Systems, Inc., San Jose, Calif.

[21] Appl. No.: 470,965

[22] Filed: Jan. 25, 1990

[51] Int. Cl.⁵ ............................................. H04B 10/04
[52] U.S. Cl. ..................................... 359/181; 359/305
[58] Field of Search ............... 455/610, 615, 609, 611, 455/612, 613, 617, 618; 370/3; 350/358; 359/181, 305

[56] References Cited

U.S. PATENT DOCUMENTS

| | | | |
|---|---|---|---|
| 4,126,834 | 11/1978 | Coppock | 350/358 |
| 4,639,092 | 1/1987 | Gottlieb et al. | 350/358 |
| 4,912,526 | 3/1990 | Iwaoka | 370/3 |
| 5,002,395 | 3/1991 | Shah | 350/358 |

Primary Examiner—Curtis Kuntz
Assistant Examiner—L. Pascal
Attorney, Agent, or Firm—Seed and Berry

[57] ABSTRACT

An optical communication system for communicating information. The systems includes a source of continuous wave laser light and one or more acoustic beams whcih are frequency or amplitude modulated by data. The laser light beam and the acoustic beams are input to an acousto-optical modulator for producing an undiffracted laser light beam and one or more diffracted laser light beams. The diffracted laser light beams are frequently shifted from the undiffracted laser light beam and contain the data to be transmitted. The diffracted and undiffracted beams are combined and transmitted over an optical fiber for demodulation at a distant location by a receiver. The receiver includes a photodiode which heterodynes the diffracted and undiffracted beams and produces signals having the frequencies of the acoustic beams. Tuning circuitry separates the signals and demodulators reconstruct the data transmitted. By using two such communication systems with a single optical fiber and by allocating the available bandwidth, simultaneous, bidirectional multi-channel communications are achieved.

72 Claims, 4 Drawing Sheets

OPTICAL COMMUNICATIONS SYSTEM AND METHOD FOR TRANSMITTING INFORMATION THROUGH A SINGLE OPTICAL WAVEGUIDE

DESCRIPTION

1. Technical Field

This invention relates to a method and apparatus for communicating information using optical waveguides such as fiber optics.

2. Background Art

The communication of data via fiber optic links provides a highspeed, relatively secure means of information exchange. Present fiber optic link architectures are limited in performance by their inability to communicate multiple data channels either simultaneously or bidirectionally. The arrangement of current, conventional systems requires one laser diode for a transmitter together with one photodiode for a receiver. Direct data modulation of the injection current to the laser diode generates an intensity-modulated optical carrier beam. The carrier beam is then focused into one end of an optical fiber which acts as a waveguide, guiding the carrier beam to the photodiode at the other end of the fiber. Square-law detection of the intensity-modulated optical carrier beam by the photodiode is used to reconstruct the original data. Thus, for each data channel one laser diode and photodiode pair are necessary. Increasing the number of data channels per laser-photodiode pair can result in significant improvements in the cost-effectiveness of fiber optic links, however, the several presently known methods for increasing the number of data channels over a single optical fiber have significant disadvantages.

The first known method uses time-division-multiplexing (TDM) coding of the data. This approach requires discrete sampling of the input data signals at rates greater than the Nyquist limit, and creates a high speed requirement for the fiber optic components even if only low input data rates are used. Critical timing of data interleave blocks and complex, and therefore expensive, electronics are required for implementation.

A second known method generates a set of RF subcarriers each modulated by different data using some appropriate modulation technique, such as amplitude shift keying (ASK), phase shift keying (PSK), or frequency shift keying (FSK). The resulting data-modulated carriers are then linearly summed along with the DC injection current of the laser diode. The result is a frequency division multiplex (FDM), a "radio" frequency subcarrier which intensity modulates the output beam of the laser diode. There are several disadvantages incumbent with this approach, one being that the optical output intensity-injection current transfer function is only linear over a limited range. It frequently has discontinuities (or "kinks") in its curve which results in non-linear modulation transfer terms. Additionally, intensity modulation of the laser diode injection current causes optical mode-hopping, especially in gain-guided lasers, and decreased operating life of the laser diode. Modulation of the injection current produces dynamic instability in the thermal conductivity of the laser diode, and in combination with subsequent thermal stresses shorten the service life of the laser diode.

A third known method is to simply increase the number of data channels used per fiber. This approach uses several laser diodes, each operating at a different optical wavelength and modulated with separate data. The resulting intensity-modulated optical beams are then linearly combined using a wavelength-division-multiplexing (WDM) grating. The resulting multiwavelength optical carrier beams are then demultiplexed by another WDM grating at the receiving end of the fiber waveguide and collected by separate photodiodes. With this approach, a laser diode and a photodiode is required for each data channel, even though only a single optical fiber is used. Presently available WDM grating are extremely costly. Further, the use of multiple laser diodes capable of operating at different optical wavelengths significantly increases both the cost and susceptibility to failure of the communications system in which it is used.

DISCLOSURE OF INVENTION

An optical communication system for communicating information from a first location to a second location. The system includes input means for producing an acoustic beam modulated by the information and having an acoustic beam frequency, light source means for producing a continuous wave laser light beam at a substantially fixed optical frequency, and modulation means for receiving the acoustic beam and the laser light beam and producing an undiffracted laser light beam and a diffracted laser light beam. The diffracted laser light beam is frequency-shifted from the frequency of the undiffracted laser light beam by the acoustic beam frequency and is diffracted through an angle that is dependent on the acoustic beam frequency. The system further includes means, at the first location, for spatially combining the undiffracted and diffracted laser light beams to produce a combined laser light beam, and transmission means for transmitting laser light between the first location and the second location. In the presently preferred embodiment, the transmission means is a single optical waveguide. The waveguide receives at the first location the combined laser light beam and transmits the combined laser light beam to the second location. The system also includes output means, at the second location, for receiving the combined laser light beam from the optical waveguide and demodulating the diffracted laser light beam to produce a demodulated signal having the acoustic beam frequency and containing the information content of the acoustic beam.

In a presently preferred embodiment of the invention, the modulation means is an acousto-optic modulator, the light source means includes a single laser diode operating in a continuous wave mode, unmodulated by the information, and the output means includes a single photodiode. The output means further includes a tuning circuit which is connected to the photodiode and tuned to the acoustic beam frequency to produce the demodulated signal. The output means of the system includes a demodulator connected to the tuning circuit and demodulating the demodulated signal to produce an output data signal containing the information content of the acoustic beam. The output means further includes a low noise amplifier amplifying the demodulated signal produced by the tuning circuit prior to input to the demodulator.

In the presently preferred embodiment, the input means includes means for producing a continuous wave signal with the acoustic beam frequency, means for modulating the continuous wave signal by a data signal containing the information to produce a drive signal with the acoustic beam frequency, and means for producing the acoustic beam in response to the drive signal. The light source means includes means for collimating the laser light beam, and the means for spatially combining the undiffracted and diffracted laser light beams includes collection lens receiving the undiffracted and diffracted laser light beams and producing the combined laser light beam.

In an alternative embodiment of the invention the acoustic beam produced by the input means comprises a plurality of acoustic beams, each acoustic beam having a different frequency and being modulated by a separate portion of the information to be communicated by the system. The modulation means produces a corresponding plurality of diffracted laser light beams, each diffracted laser light beam being diffracted by a different diffraction angle and frequency-shifted by the frequency of the corresponding acoustic beam. The output means demodulates the plurality of diffracted laser light beams to produce a plurality of demodulated signals corresponding to the plurality of acoustic beams, each demodulated signal containing the information content of the corresponding acoustic beam. With this embodiment, multiple separate information channels are simultaneously communicated over the single optical waveguide.

Yet other alternative embodiments of the invention provide bidirectional communication, using single or multiple data channels, as desired. Other features and advantages of the invention will become apparent from the following detailed description, taken in conjunction with the accompanying drawings.

BEST MODES FOR CARRYING OUT THE INVENTION

Figure 1:
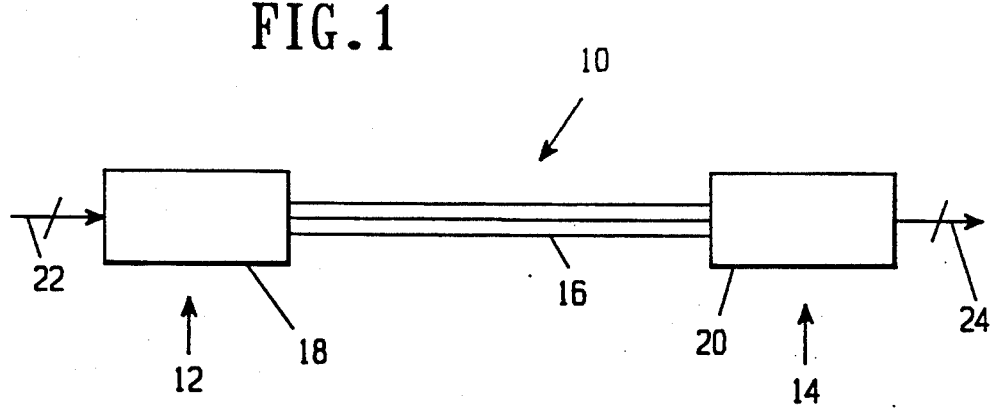
FIG. 1 is a schematic diagram of a first embodiment of a unidirectional optical communication system according to the present invention.

FIG. 1 is a schematic diagram of a first embodiment of a unidirectional optical communication system 10 according to the present invention. The optical communication system 10 communicates information from a first location 12 to a second location 14 using a single optical waveguide, such as an optical fiber 16. It is noted that other means to transmit laser light between the first and second locations may also be used. A transmitter 18 is placed at the first location 12, and a receiver 20 is placed at the second location 14. The optical fiber 16 is connected between the transmitter 18 and the receiver 20. The receiver 18 receives the information to be transmitted in the form of an input data signal 22, either in analog or digital form. The transmitter 18 transforms the input data signal 22 to an optical form appropriate for communication through the optical fiber 16 to the receiver 20. The receiver 20, upon receipt of the optical signal transmitted through the optical fiber 16, transforms the optical signal to an output data signal 24, containing the analog or digital information transmitted.

Figure 2:
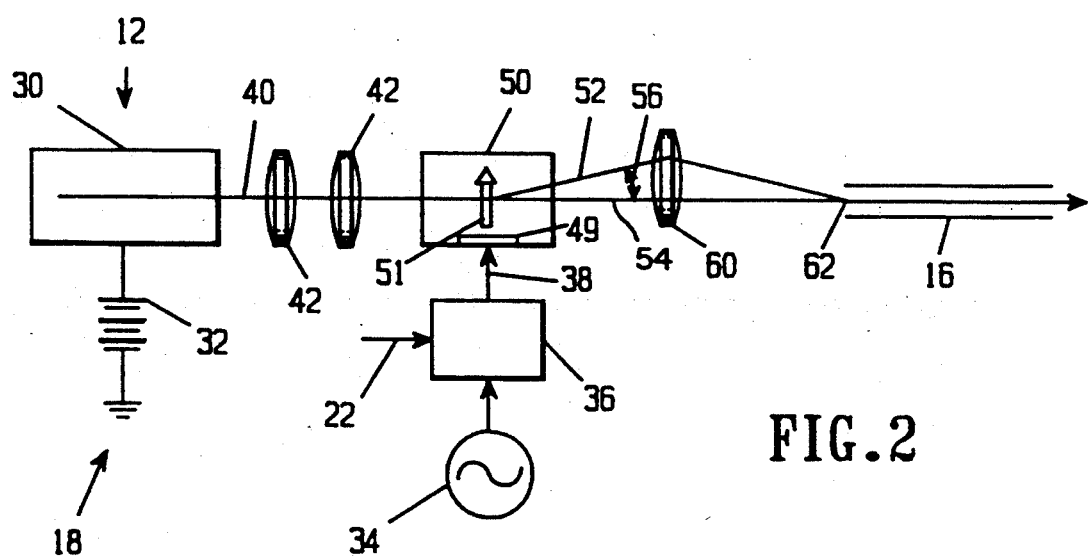
FIG. 2 is a schematic diagram of a first embodiment of a transmitter used in the system of FIG. 1 using a single data channel.

A first embodiment of the transmitter 18 of the invention is shown in FIG. 2. The transmitter 18 includes a laser beam source, such as a laser diode 30. The laser diode 30 operates in a continuous wave (CW) mode, producing laser light at a substantially constant frequency. If the laser beam source is a laser diode, the laser beam is produced by operating a direct current (DC) laser diode injection current source 32, which activates the laser diode.

The data signal 22 and the CW output of a radio frequency (RF) oscillator 34 are input to a modulator 36, which produces an RF electrical drive signal 38 modulated by the data signal 22. The drive signal 38 is applied to the piezoelectric crystal 49 which forms a part of an acousto-optic modulator 50, such as manufactured by Crystal Technology, Inc., under part no. 4050. The piezoelectric crystal 49 generates a traveling wave acoustic beam 51 with a radio frequency in the birefringent material of the acousto-optic modulator.

The laser beam source 30 provides a continuous wave optical beam 40 which is transmitted to the acousto-optic modulator 50. The optical beam 40 is collimated by collimation optics 42 and directed through the modulator 50 so as to pass through the traveling wave acoustic beam 51 at an angle generally orthogonal thereto.

The modulator 50 is a traveling wave modulator which scatters the optical beam 40 into one or more diffracted optical beams 52 (only one diffracted beam being shown and used in the embodiment of FIG. 2). The diffracted optical beam 52 will have a diffraction angle 56 which is dependent upon the acoustic RF frequency of the traveling acoustic beam 51 passing through the modulator 50 and the geometry of the modulator. The modulator 50 also produces an undiffracted optical beam 54 which is substantially unaffected by its passage through the modulator. Since the optical beam 40 is an unmodulated continuous wave, the acousto-optic modulator 50 will also amplitude modulate the diffracted optical beam 52 as a function of the amplitude of the traveling wave acoustic beam 51 in the modulator 50. By utilizing these properties of the acousto-optic modulator 50, it is possible to use one or both of amplitude modulation or frequency modulation to transmit a unidirectional data channel over the optic fiber 16, or if desired, to transmit simultaneously multiple data channels over the single optic fiber unidirectionally or bidirectionally, as will be described in more detail below.

The optical communication system 10 of the present invention also utilizes a property of the acousto-optic modulator 50 which results in the optical frequency of the diffracted optical beam 52 being Doppler-shifted. The amount of the Doppler shift is equal to the frequency of the traveling wave acoustic beam 51. This Doppler shift is a product of the conservation of energy between the interaction of the photon of the acoustic beam 51 and the photon of the optical beam 40 and results from the fact that the diffracted optical beam 52 travels a different path in the acousto-optic modulator 50 from the undiffracted optical beam 54. This is indicated in by following equations:

$$\Delta\omega = 2\omega \frac{V_a}{c/\eta}$$

$$\Delta\omega = 2\omega \frac{V_s \sin\theta}{c/\eta}$$

$$\Delta\omega = \frac{2\pi V_s}{\lambda_s} = \omega_s$$

therefore $\omega_d = \omega + \omega_s$, where $\omega$ is the original optical frequency of the optical beam 40, $v_a$ is the acoustic wave velocity of the traveling wave acoustic beam 51, $\lambda_s$ is the signal wavelength of the traveling wave acoustic beam 51, $\sin\theta$ is the angle of the traveling wave acoustic beam 51, c is the velocity of light, $\eta$ is the refractive index of the acousto-optic modulator 50, $v_s$ is the acoustic signal velocity of the traveling wave acoustic beam 51, $\omega_d$ is the Doppler-shifted frequency of the diffracted optical beam 52, and $\omega_s$ is the acoustic wave frequency of the traveling wave acoustic beam 51. As a result, the Doppler-shifted frequency (i.e., $\omega_d$) can be expressed as the sum of the original optical frequency of the optical beam 40 (i.e., $\omega$) and the acoustic wave frequency of the traveling wave acoustic beam 51 (i.e., $\omega_s$).

As noted above, the undiffracted optical beam 54 passes substantially undisturbed through the acousto-optic modulator 50. The only effect of the modulator 50 on the undiffracted optical beam 54 is the loss of optical intensity which is equal to the intensity of the diffracted beam 52. This is also known as "down modulation."

With the present invention, it is possible to use amplitude modulation or frequency modulation, or both, as will be described in more detail below. If desired, the intensity of the traveling wave acoustic beam 51 can be amplitude modulated by the data signal 22, which results in the diffracted optical beam 52 also being amplitude modulated. As such, if the frequency of the acoustic traveling wave beam 51 is held constant while it is amplitude modulated by the data signal 22, the diffraction angle 56 of the diffracted optical beam 52 (which is measured with respect to the undiffracted optical beam 54) will remain constant. The effect of the angle 56 between the diffracted and undiffracted optical beams 52 and 54 is to form a virtual single point optical source for the two optical beams 52 and 54.

If it is desired to frequency modulate the traveling wave acoustic beam 51 with the data signal 22, the beam 51 will have a varying frequency and the diffraction angle 56 of the diffracted optical beam 52 will similarly vary. For example, if binary digital data is to be transmitted, the data signal 22 can be used to produce a frequency modulated drive signal 38 and hence modulate the traveling wave acoustic beam 51 so that the beam 51 is at a first frequency to represent a "1" bit, and is at a different second frequency, or when using ON/OFF keying is non-existent, to represent a "0" bit. As such, a "1" bit will be represented by the diffracted optical beam 52 having a first diffraction angle 56 corresponding to the first frequency and a "0" bit will be represented by the diffracted optical beam having a different second diffraction angle or, if ON/OFF keying is used, being non-existent. This change in diffraction angle, and the resulting change in the Doppler-shift of the diffracted optical beam 52 that results is used to transmit and then at the receiver 20 to reconstruct the digital data. It is also possible to simultaneously both amplitude and frequency modulate the traveling wave acoustic beam 51, and hence the diffracted optical beam 52, to transmit even more information. While just described for digital data, these modulation techniques can also be used to transmit analog information.

As shown above, the diffracted optical beam 52 is Doppler-shifted by an amount equal to the frequency $\omega_s$ of the traveling wave acoustic beam 51. An optical condensing or collection lens element 60 is positioned to intercept both the diffracted and undiffracted optical beams 52 and 54, and combine the two beam spatially into a combined optical beam 62. The combined optical beam 62 is then directed into the optical fiber 16 using conventional means and through the optical fiber to the receiver 20.

Figure 3:
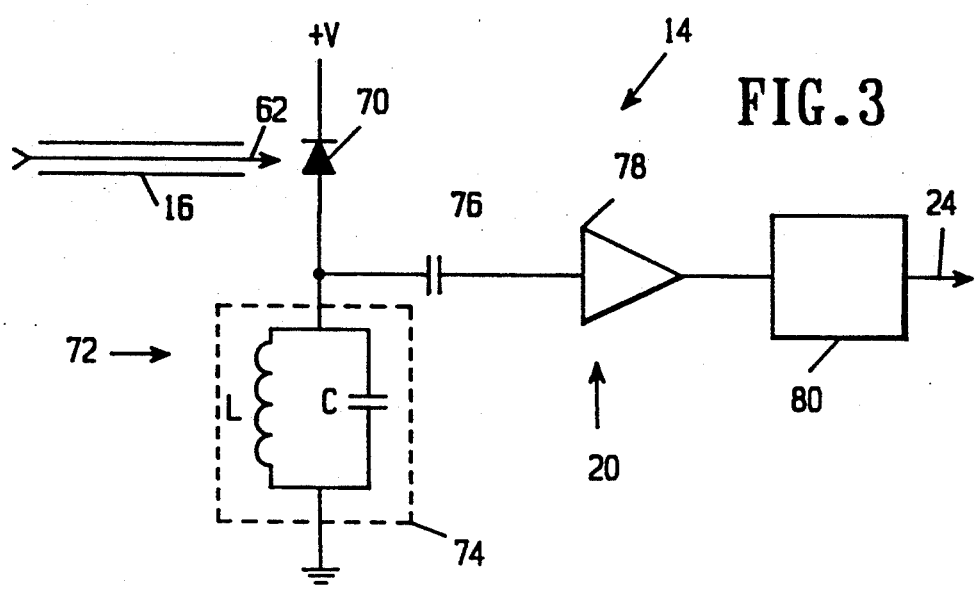
FIG. 3 is a schematic diagram of a first embodiment of a receiver used in the system of FIG. 1 using a single data channel.

A first embodiment of the receiver 20 of the present invention is shown in FIG. 3. The receiver 20 includes a photodiode 70 which is illuminated by the combined optical beam 62 and, as such, simultaneously illuminated by both the diffracted and undiffracted optical beams 52 and 54 which comprise the combined optical beam. The photodiode 70 and accompanying electronic circuitry, indicated generally by reference numeral 72, are provided with an electrical bandwidth that is equal to or greater than the frequency of the traveling wave acoustic beam 51. As such, the photodiode 70 acts as an optical heterodyne mixer and produces sum and difference frequency components, as are shown by the following equation:

$$E_0(t) = E_1 E_2 + E_1 E_2 \cos(\omega_1 - \omega_2)t + E_1 E_2 \cos(\omega_1 + \omega_2)t$$

where $E_1$ is the amplitude of the undiffracted optical beam 54, $E_2$ is the amplitude of the diffracted optical beam 52, $\omega_1$ is the Doppler-shifted frequency of the diffracted optical beam 52, and $\omega_2$ is the frequency of the undiffracted optical beam 54.

The first term of the equation is the DC envelope term. The third term in the equation is the sum frequency, which cannot, in actuality, exist in the photodiode 70, since the sum frequency is greater than the response frequency bandwidth of the photodiode. The second term of the equation is the desired difference frequency term $(\omega_1 - \omega_2)$.

By using the difference frequency term $(\omega_1 - \omega_2)$, the frequency of the traveling wave acoustic beam 51 (i.e., $\omega_s$) which has been modulated by the data signal 22 containing the input data can be isolated and the input data reconstructed at the receiver 20. Since $\omega_1$ is the Doppler-shifted frequency of the diffracted optical beam 52 (i.e., $\omega_d = \omega + \omega_s$) and $\omega_2$ is the frequency of the undiffracted optical beam 54 (i.e., $\omega$, the original unchanged frequency of the optical beam 40), the difference frequency $\omega_1 - \omega_2 = \omega_d - \omega = \omega_s$. Since $\omega_s$ is the frequency of the traveling wave acoustic beam 51 which was modulated by the data signal 22 at the transmitter 18, it contains the input data when frequency modulation is used. The third term of the equation also contains any amplitude modulated information. Through the use of simple frequency domain bandpass filtering using the electronic circuit 72 tuned to the frequency of the traveling wave acoustic beam 51, as will be described below, a data channel is effectively created. Using simple intensity demodulation of the recovered acoustic wave produces the input data at the receiver 20 and provides the output signal 24 containing that data.

The electronic circuitry 72 used to accomplish the intensity demodulation includes a tuning circuit 74 (such as an LC resonant circuit) to select the frequency of the traveling wave acoustic beam 51, and a coupling capacitor 76 connected to the node between the photodiode 70 and the tuning circuit 74. The output of the coupling capacitor 76 passes through a low noise amplifier 78 to a demodulator 80. The demodulator 80 can include conventional decision circuitry (not shown) and the output of the demodulator is the output signal 24.

The acousto-optic modulation provided by the modulator 50 of FIG. 2 is typically linear over both a large intensity range and a large frequency range. As will be described in more detail with respect to FIGS. 4 and 5, by simultaneous use of several traveling wave acoustic beams of different acoustic frequencies, multiple data channels can be simultaneously created and transmitted using a single optical fiber 16. As noted above, the acousto-optic modulator 50 scatters the optical beam 40 into one or more diffracted optical beams 52, with the diffraction angle 56 of each diffracted optical beam being dependent upon the acoustic RF frequency of the traveling wave acoustic beam 51 which caused the diffraction of the diffracted optical beam in the modulator 50. As such, by use of several acoustic beams, each separately modulated by a different data signal, multiple diffracted optical beams can be simultaneously generated in the modulator 50. Each diffracted optical beam will have a different Doppler shift dependent on the particular frequency of the acoustic beam which produced it. As discussed above, when this frequency is modulated by a data signal, it contains the data to be transmitted. By recombining the multiple diffracted optical beams along with the undiffracted optical beam, and transmitting the combined optical beam 62 through the optical fiber 16, multiple data channels can be transmitted in parallel in a single optical fiber using a single laser diode 30, and as will be described below, using a single photodiode 70 in the receiver 20.

Figure 4:
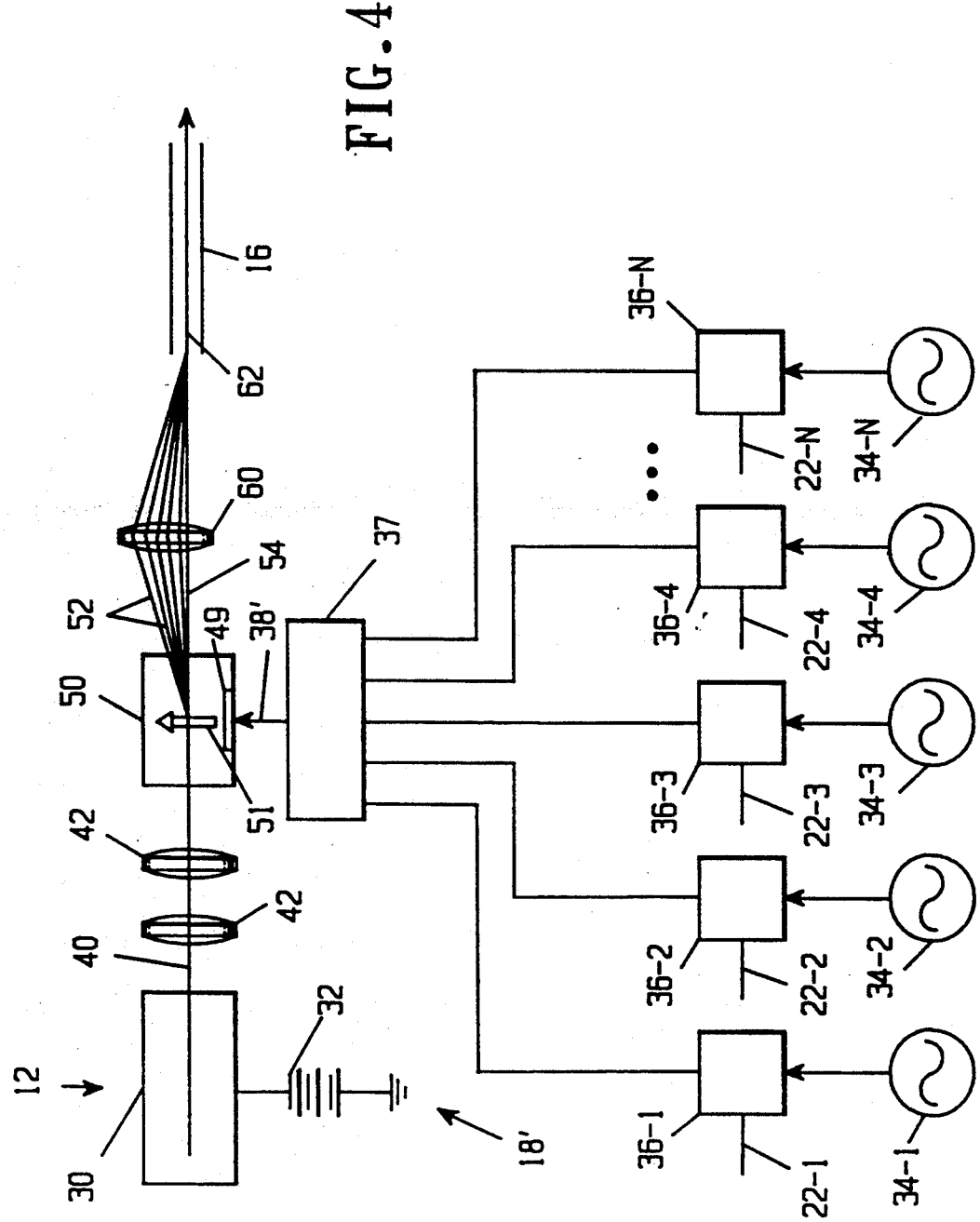
FIG. 4 is a schematic diagram of a second embodiment of a transmitter according to the present invention using multiple data channels.

A schematic drawing of a second embodiment of the transmitter 18' of the invention designed to transmit multiple data channels is disclosed in FIG. 4. For convenience, components which are the same as those shown for the first embodiment will be given the same reference numerals. The transmitter 18' of FIG. 4 is adapted to handle a desired plurality N of distinct data signals 22-1, 22-2, ..., and 22-N, simultaneously. Each of the data signals 21-1 through 22-N is input to a corresponding separate modulator 36-1, 36-2, ..., and 36-N which also receives the CW output of a corresponding separate RF oscillator 34-1, 34-2, ..., and 34-N, each operating in its own distinct frequency band. In the manner described above, each of the input signals 22-1 through 22-N can be separated demodulated by a receiver 20' at the second location 14 (see FIG. 5).

The data-modulated outputs of the modulators 36-1 through 36-N are combined by a linear power combiner 37, which produces an RF electric drive signal 38'. The drive signal 38' is applied to the acousto-optic modulator 50 and simultaneously generates N multiple traveling acoustic beams 51-1, 51-2, ..., and 51-N, in the modulator 50. Much as described above for a single beam, this creates N diffracted optical beams 52-1, 52-2, ..., 52-N, each diffracted at a different diffraction angle 56-1, 56-2, ..., and 56-N, respectively.

Figure 5:
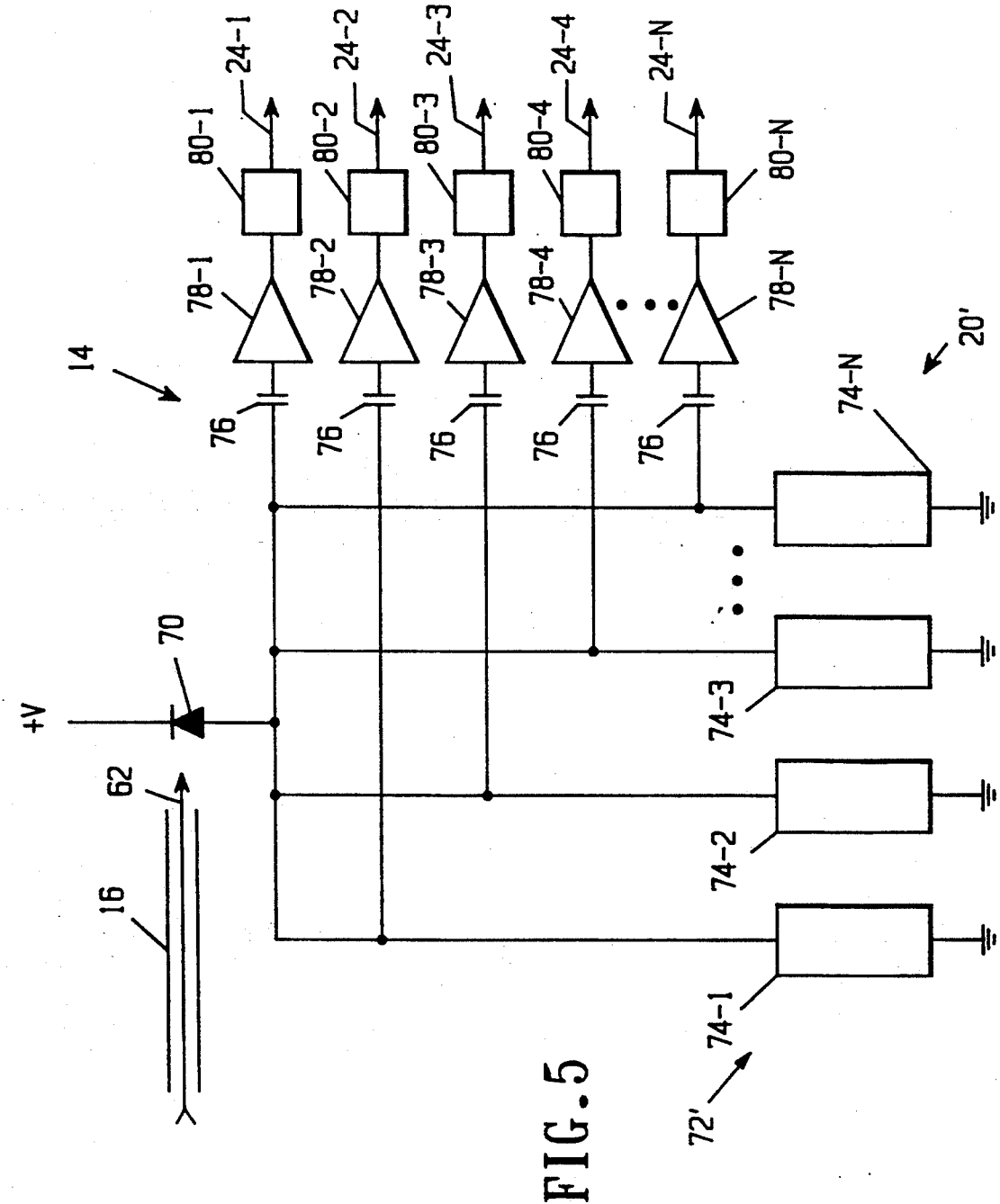
FIG. 5 is a schematic diagram of a second embodiment of a receiver according to the present invention using multiple data channels.

A schematic diagram of the receiver 20' used with the transmitter 18' of the second embodiment of the invention is shown in FIG. 5. The electronic circuitry 72' of the receiver 20' consists of N separate tuning circuits 74-1, 74-2, ..., and 74-N. Each of the tuning circuits is connected to the photodiode 70 and also to a corresponding separate low noise amplifier 78-1, 78-2, ..., and 78-N. Each amplifier has its output connected to a corresponding separate demodulator 80-1, 80-2, ..., and 80-N which produces a corresponding distinct output signal 24-1, 24-2, ..., and 24-N. Each of the tuning circuits 74-1 through 74-N is tuned to the frequency band of the corresponding RF oscillator 34-1 through 34-N. This effectively creates N data channels each having its own channel frequency.

The optical communication system of FIGS. 4 and 5 can achieve simultaneous, parallel data channels which are continuous in time (that is, not sampled), while utilizing the single optical fiber 16, the single laser diode 30 and the single photodiode 70. Further, the modulation is performed outside the laser diode 30 which allows the laser diode to operate in a continuous wave mode. The number of channels available is limited only by the bandwidth of the acousto-optic modulator 50. The number of channels which can be maintained is calculated by dividing the bandwidth of the modulator 50 by the bandwidth used for the individual channels.

Figure 6:
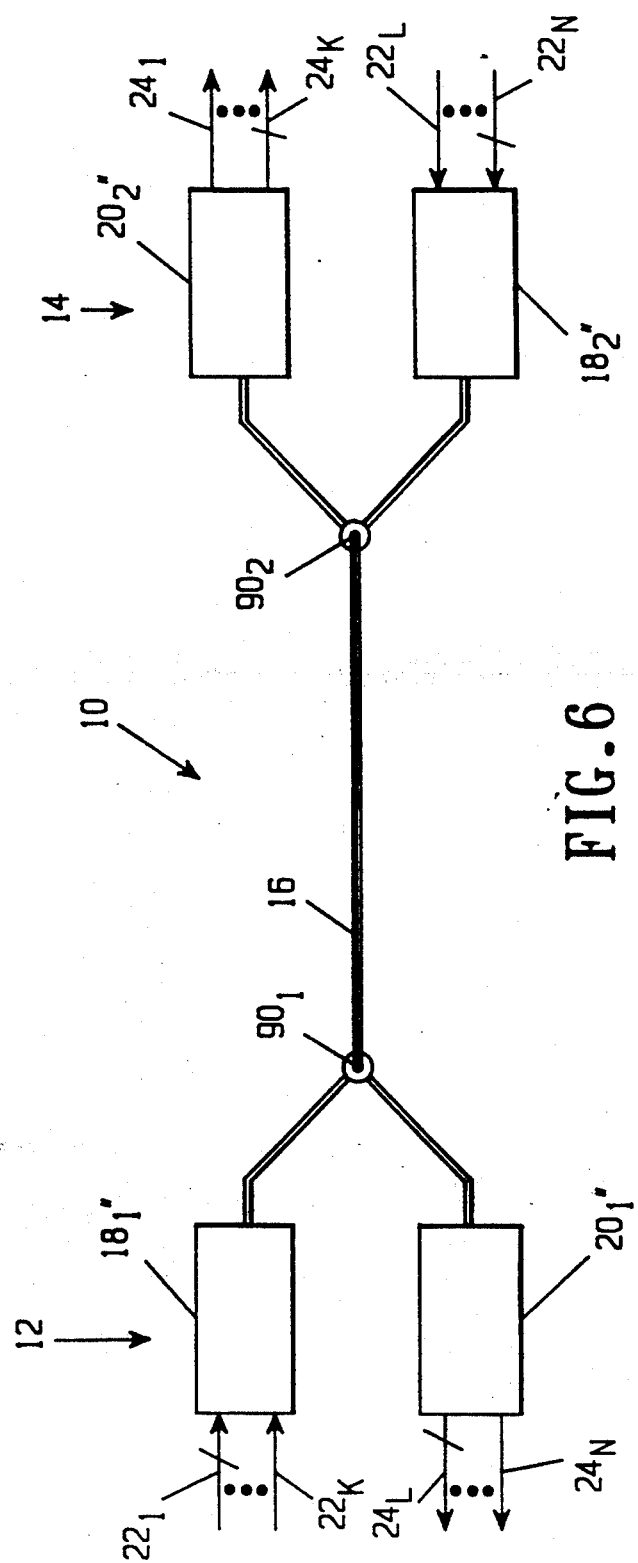
FIG. 6 is a schematic diagram of a bidirectional optical communication system according to the present invention.

As shown in FIG. 6, true bidirectional data channel operation may be achieved by simply allocating one set of data channel frequencies for transmission in one direction through the optical fiber 16, and another set of data channel frequency for transmission in the opposite direction. A transmitter $18_1''$ and a receiver $20_1''$ are positioned at the first location 12, and a transmitter $18_2''$ and a receiver $20_2''$ are positioned at the second location 14. The transmitter $18_1''$ and receiver $20_2''$ operate together and handle data signals 22-1 through 22-K, and the transmitter $18_2''$ and the receiver $20_1''$ operate together and handle data signals 22-L through 22-N. Thus, information contained in data signals 22-1 through 22-K of the first location 12 can be simultaneously transmitted to the second location 14 to produce the output data signals 24-1 through 24-K, and information contained in the data signals 22-L through 22-N of the second location 14 can be simultaneously transmitted to the first location 12 to produce the output data signals 24-L through 24-N, with all transmissions occurring simultaneously through the single optical fiber 16. The result is true, simultaneous bidirectional transmission of information. The input and output signals at the first location 12 are separated by the wye connector $90_1$, and the input and output signals at the second location 14 are separated by the wye connector $90_2$. While just described for multiple data channel operation, such as described above for FIGS. 4 and 5, it is noted that the transmitters and receivers of FIG. 6 can be used for single data channel operation in each direction, such as described above for FIGS. 2 and 3.

It will be appreciated that, although specific embodiments of the invention have been described herein for purposes of illustration, various modifications may be made without departing from the spirit and scope of the invention. Accordingly, the invention is not limited except by the appended claims.

I claim:

1. An optical communication system for communicating information from a first location to a second location, comprising:

input means for producing an acoustic beam modulated by the information and having an acoustic beam frequency;

light source means for producing a continuous wave laser light beam at a substantially fixed optical frequency;

modulation means for receiving the acoustic beam and the laser light beam and producing an undiffracted laser light beam and a diffracted laser light beam, the diffracted laser light beam being frequency-shifted from the frequency of the undiffracted laser light beam by the acoustic beam frequency and being diffracted through an angle that is dependent on the acoustic beam frequency;

means, at the first location, for spatially combining the undiffracted and diffracted laser light beams to produce a combined laser light beam;

a single optical waveguide connected between the first location and the second location, receiving at the first location the combined laser light beam and transmitting the combined laser light beam to the second location; and output means, at the second location, for receiving the combined laser light beam from the optical waveguide and demodulating the diffracted laser light beam to produce a demodulated signal having the acoustic beam frequency and containing the information content of the acoustic beam.

2. The optical communication system of claim 1 wherein the modulation means is an acousto-optic modulator.

3. The optical communication system of claim 1 wherein the light source means includes a single laser diode operating in a continous wave mode.

4. The optical communication system of claim 1 wherein the output means includes a single photodiode.

5. The optical communication system of claim 4 wherein the output means further includes a tuning circuit which is connected to the photodiode and tuned to the acoustic beam frequency to produce the demodulated signal.

6. The optical communication system of claim 5 wherein the output means further includes a demodulator connected to the tuning circuit and demodulating the demodulated signal to produce an output data signal containing the information content of the acoustic beam.

7. The optical communication system of claim 6 wherein the output means further includes a low noise amplifier amplifying the demodulated signal produced by the tuning circuit prior to input to the demodulator.

8. The optical communication system of claim 1 wherein the input means includes means for producing a continuous wave signal with the acoustic beam frequency, means for modulating the continuous wave signal by a data signal containing the information to produce a drive signal with the acoustic beam frequency, and means for producing the acoustic beam in response to the drive signal.

9. The optical communication system of claim 1 wherein the light source means includes means for collimating the laser light beam.

10. The optical communication system of claim 1 wherein the means for spatially combining the undiffracted and diffracted laser light beams includes collection lens receiving the undiffracted and diffracted laser light beams and producing the combined laser light beam.

11. The optical communication system of claim 1 wherein the acoustic beam produced by the input means comprises a plurality of acoustic beams, each acoustic beam having a different frequency and being modulated by a separate portion of the information to be communicated by the system, wherein the modulation means produces a corresponding plurality of diffracted laser light beams, each diffracted laser light beam being diffracted by a different diffraction angle and frequency-shifted by the frequency of the corresponding acoustic beam, and wherein the output means demodulates the plurality of diffracted laser light beams to produce a plurality of demodulated signals corresponding to the plurality of acoustic beams, each demodulated signal containing the information content of the corresponding acoustic beam, whereby multiple separate information channels are simultaneously communicated over the single optical waveguide.

12. The optical communication system of claim 11 wherein the modulator means is an acousto-optic modulator.

13. The optical communication system of claim 11 wherein the light source means includes a single laser diode operating in a continuous wave mode.

14. The optical communication system of claim 11 wherein the output means includes a single photodiode.

15. The optical communication system of claim 14 wherein the output means further includes a plurality of tuning circuits which are each connected to the photodiode and tuned to the acoustic beam frequency of a different one of the plurality of acoustic beams to produce one of the plurality of demodulated signals.

16. The optical communication system of claim 15 wherein the output means further includes a plurality of demodulators, each demodulator being connected to one of the tuning circuits and demodulating a corresponding one of the plurality of demodulated signals to produce an output signal containing the information content of the corresponding acoustic beam.

17. The optical communication system of claim 16 wherein the output means further includes a plurality of low noise amplifiers, each amplifier amplifying a different one of the plurality of demodulated signals prior to input of the demodulated signal to the corresponding one of the plurality of demodulators.

18. The optical communication system of claim 11 wherein the input means includes means for producing a plurality of continuous wave signals, each continuous wave signal having the frequency of one of the plurality of acoustic beams, and means for modulating each continuous wave signal by a separate data signal containing the information content of the corresponding acoustic beam, to produce a plurality of modulated signals.

19. The optical communication system of claim 18 wherein the input means combines the modulated signals to produce a drive signal in the acoustic frequency band, and includes means for producing the plurality of acoustic beams in response to the drive signal.

20. The optical communication system of claim 11 wherein the light source means includes means for collimating the laser light beam.

21. The optical communication system of claim 11 wherein the means for spatially combining the undiffracted and diffracted laser light beams includes collection lens receiving the undiffracted and diffracted laser light beams and producing the combined laser light beam.

22. An optical communication system for communicating information from a first location to a second location, comprising:

input means for producing a plurality of acoustic beams, each acoustic beam having a different acoustic beam frequency and being modulated by a separate portion of the information to be communicated by the system;

light source means for producing a continuous wave laser light beam at a substantially fixed optical frequency;

modulation means for receiving the acoustic beams and the laser light beam and producing an undiffracted laser light beam and a plurality of diffracted laser light beams, each diffracted laser light beam corresponding to one of the plurality of acoustic beams, each of the plurality of diffracted laser light beams being frequency-shifted from the frequency of the undiffracted laser light beam by the acoustic beam frequency of the corresponding acoustic beam and being diffracted through an angle that is dependent on the acoustic beam frequency of the corresponding acoustic beam, whereby each of the diffracted laser light beams is diffracted by a different diffraction angle and frequency-shifted by a different frequency;

means, at the first location, for spatially combining the undiffracted and diffracted laser light beams to produce a combined laser light beam;

a single optical waveguide connected between the first location and the second location, receiving at the first location the combined laser light beam and transmitting the combined laser light beam to the second location; and output means, at the second location, for receiving the combined laser light beam from the optical waveguide and demodulating the diffracted laser light beams to produce a plurality of demodulated signals corresponding to the plurality of acoustic beams, each demodulated signal having the acoustic beam frequency of the corresponding acoustic beam and containing the information content of the corresponding acoustic beam, whereby multiple separate information channels are simultaneously communicated over the single optical waveguide.

23. The optical communication system of claim 22 wherein the modulator means is an acousto-optic modulator.

24. The optical communication system of claim 22 wherein the light source means includes a single laser diode operating in a continuous wave mode.

25. The optical communication system of claim 22 wherein the output means includes a single photodiode.

26. The optical communication system of claim 25 wherein the output means further includes a plurality of tuning circuits which are each connected to the photodiode and tuned to the acoustic beam frequency of a different one of the plurality of acoustic beams to produce one of the plurality of demodulated signals.

27. The optical communication system of claim 26 wherein the output means further includes a plurality of demodulators, each demodulator being connected to one of the tuning circuits and demodulating a corresponding one of the plurality of demodulated signals to produce an output signal containing the information content of the corresponding acoustic beam.

28. The optical communication system of claim 27 wherein the output means further includes a plurality of low noise amplifiers, each amplifier amplifying a different one of the plurality of demodulated signals prior to input of the demodulated signal to the corresponding one of the plurality of demodulators.

29. The optical communication system of claim 22 wherein the input means includes means for producing a plurality of continuous wave signals, each continuous wave signal having the frequency of one of the plurality of acoustic beams, and means for modulating each continuous wave signal by a separate data signal containing the information content of the corresponding acoustic beam, to produce a plurality of modulated signals.

30. The optical communication system of claim 29 wherein the modulated signals are combined to produce a drive signal in the acoustic frequency band, and wherein the modulation means includes means for producing the plurality of acoustic beams in response to the drive signal.

31. The optical communication system of claim 22 wherein the light source means includes means for collimating the laser light beam.

32. The optical communication system of claim 22 wherein the means for spatially combining the undiffracted and diffracted laser light beams includes collection lens receiving the undiffracted and diffracted laser light beams and producing the combined laser light beam.

33. A bidirectional optical communication system for communicating information between a first location and a second location, comprising:

a single optical waveguide connected between the first location and the second location;

first input means for producing a first acoustic beam modulated by first information and having a first acoustic beam frequency;

first light source means for producing a first continuous wave laser light beam at a substantially fixed first optical frequency;

first modulation means for receiving the first acoustic beam and the first laser light beam and producing an undiffracted first laser light beam and a diffracted first laser light beam, the diffracted first laser light beam being frequency-shifted from the frequency of the undiffracted first laser light beam by the first acoustic beam frequency and being diffracted through a first angle that is dependent on the first acoustic beam frequency;

first means, at the first location, for spatially combining the undiffracted and diffracted first laser light beams to produce a first combined laser light beam, and directing the first combined laser light beam into the optical waveguide for transmission of the first combined laser light beam to the second location;

first output means, at the second location, for receiving the first combined laser light beam from the optical waveguide and demodulating the first diffracted laser light beam to produce a first demodulated signal having the first acoustic beam frequency and containing the first information content of the first acoustic beam;

second input means for producing a second acoustic beam modulated by second information and having a second acoustic beam frequency;

second light source means for producing a second continuous wave laser light beam at a substantially fixed second optical frequency;

second modulation means for receiving the second acoustic beam and the second laser light beam and producing an undiffracted second laser light beam and a diffracted second laser light beam, the diffracted second laser light beam being frequency-shifted from the frequency of the undiffracted second laser light beam by the second acoustic beam frequency and being diffracted through a second angle that is dependent on the second acoustic beam frequency;

second means, at the second location, for spatially combining the undiffracted and diffracted second laser light beams to produce a second combined laser light beam, and directing the second combined laser light beam into the optical waveguide for transmission of the second combined laser light beam to the first location; and second output means, at the first location, for receiving the second combined laser light beam from the optical waveguide and demodulating the second diffracted laser light beam to produce a second demodulated signal having the second acoustic beam frequency and containing the second information content of the second acoustic beam.

34. The bidirectional optical communication system of claim 33 wherein the first and second modulation means each includes an acousto-optic modulator.

35. The bidirectional optical communication system of claim 33 wherein the first and second light source means each includes a single laser diode operating in a continuous wave mode.

36. The bidirectional optical communication system of claim 35 wherein the laser diodes comprising the first and second light sources generate laser light beams at substantially the same frequency.

37. The bidirectional optical communication system of claim 33 wherein the first and second output means each includes a single photodiode.

38. The bidirectional optical communication system of claim 37 wherein the first and second output means further each includes a tuning circuit which is connected to the corresponding photodiode and tuned to the first or second acoustic beam frequency to produce the first or second demodulated signal.

39. An optical communication system for communicating information from a first location to a second location, comprising:

input means for producing a drive signal modulated by the information and having an acoustic frequency;

a single laser diode producing a continuous wave laser light beam at a substantially fixed optical frequency;

an acousto-optic modulator receiving the drive signal and generating an acoustic beam at the acoustic frequency and containing the information, and in response to the interaction of the acoustic beam and the laser light beam producing an undiffracted laser light beam and a diffracted laser light beam, the diffracted laser light beam being frequency-shifted from the frequency of the undiffracted laser light beam by the acoustic frequency and being diffracted through an angle that is dependent on the acoustic frequency;

means, at the first location, for spatially combining the undiffracted and diffracted laser light beams to produce a combined laser light beam;

a single optical fiber connected between the first location and the second location, receiving at the first location the combined laser light beam and transmitting the combined laser light beam to the second location; and a single photodiode at the second location receiving the combined laser light beam from the optical fiber and acting as an optical heterodyne to demodulate the diffracted laser light beam and produce a demodulated signal having the acoustic frequency and containing the information content of the acoustic beam.

40. A method for optically communicating information from a first location to a second location, comprising the steps of:

producing an acoustic beam modulated by the information and having an acoustic beam frequency;

producing a continuous wave laser light beam at a substantially fixed optical frequency;

receiving the acoustic beam and the laser light beam and producing an undiffracted laser light beam and a diffracted laser light beam, the diffracted laser light beam being frequency-shifted from the frequency of the undiffracted laser light beam by the acoustic beam frequency and being diffracted through an angle that is dependent on the acoustic beam frequency;

spatially combining at the first location the undiffracted and diffracted laser light beams to produce a combined laser light beam;

providing a single optical waveguide connected between the first location and the second location which receives at the first location the combined laser light beam and transmits the combined laser light beam to the second location; and receiving at the second location the combined laser light beam from the optical waveguide and demodulating the diffracted laser light beam to produce a demodulated signal having the acoustic beam frequency and containing the information content of the acoustic beam.

41. The communication method of claim 40 wherein the step of producing the undiffracted and diffracted laser light beam includes the step of directing the laser light beam and the acoustic beam at transverse angles through an acousto-optic modulator.

42. The communication method of claim 40 wherein the step of producing the laser light beam includes the step of operating a single laser diode in a continuous wave mode.

43. The communication method of claim 40 wherein the step of demodulating the diffracted laser light beam includes the step of illuminating a single photodiode with the combined laser light beam.

44. The communication method of claim 43 wherein the step of demodulating the diffracted laser light beam includes the step of applying the output signal of the photodiode to a tuning circuit tuned to the acoustic beam frequency to produce the demodulated signal.

45. The communication method of claim 40 wherein the step of producing the acoustic beam includes the steps of producing a continuous wave signal with the acoustic beam frequency, modulating the continuous wave signal by a data signal containing the information to produce a drive signal with the acoustic beam frequency, and producing the acoustic beam in response to the drive signal.

46. An optical communication system for communicating information from a first location to a second location, comprising:

input means for producing an acoustic beam modulated by the information and having an acoustic beam frequency;

light source means for producing a continuous wave laser light beam at a substantially fixed optical frequency;

modulation means for receiving the acoustic beam and the laser light beam and producing an undiffracted laser light beam and a diffracted laser light beam, the diffracted laser light beam being frequency-shifted from the frequency of the undiffracted laser light beam by the acoustic beam frequency and being diffracted through an angle that is dependent on the acoustic beam frequency;

means, at the first location, for spatially combining the undiffracted and diffracted laser light beams to produce a combined laser light beam;

transmission means for receiving at the first location the combined laser light beam and transmitting the combined laser light beam to the second location; and output means for receiving, at the second location, the transmitted combined laser light beam and demodulating the diffracted laser light beam to produce a demodulated signal having the acoustic beam frequency and containing the information content of the acoustic beam.

47. The optical communication system of claim 46 wherein the modulation means is an acousto-optic modulator.

48. The optical communication system of claim 46 wherein the light source means includes a single laser diode operating in a continuous wave mode.

49. The optical communication system of claim 46 wherein the output means includes a single photodiode.

50. The optical communication system of claim 49 wherein the output means further includes a tuning circuit which is connected to the photodiode and tuned to the acoustic beam frequency to produce the demodulated signal.

51. The optical communication system of claim 50 wherein the output means further includes a demodulator connected to the tuning circuit and demodulating the demodulated signal to produce an output data signal containing the information content of the acoustic beam.

52. The optical communication system of claim 51 wherein the output means further includes a low noise amplifier amplifying the demodulated signal produced by the tuning circuit prior to input to the demodulator.

53. The optical communication system of claim 46 wherein the input means includes means for producing a continuous wave signal with the acoustic beam frequency, means for modulating the continuous wave signal by a data signal containing the information to produce a drive signal with the acoustic beam frequency, and means for producing the acoustic beam in response to the drive signal.

54. The optical communication system of claim 46 wherein the light source means includes means for collimating the laser light beam.

55. The optical communication system of claim 46 wherein the means for spatially combining the undiffracted and diffracted laser light beams includes collection lens receiving the undiffracted and diffracted laser light beams and producing the combined laser light beam.

56. The optical communication system of claim 46 wherein the acoustic beam produced by the input means comprises a plurality of acoustic beams, each acoustic beam having a different frequency and being modulated by a separate portion of the information to be communicated by the system, wherein the modulation means produces a corresponding plurality of diffracted laser light beams, each diffracted laser light beam being diffracted by a different diffraction angle and frequency-shifted by the frequency of the corresponding acoustic beam, and wherein the output means demodulated the plurality of diffracted laser light beams to produce a plurality of demodulated signals corresponding to the plurality of acoustic beams, each demodulated signal containing the information content of the corresponding acoustic beam, whereby multiple separate information channels are simultaneously communicated.

57. The optical communication system of claim 56 wherein the modulator means is an acousto-optic modulator.

58. The optical communication system of claim 56 wherein the light source means includes a single laser diode operating in a continuous wave mode, unmodulated by the information.

59. The optical communication system of claim 56 wherein the output means includes a single photodiode.

60. The optical communication system of claim 59 wherein the output means further includes a plurality of tuning circuits which are each connected to the photodiode and tuned to the acoustic beam frequency of a different one of the plurality of acoustic beams to produce one of the plurality of demodulated signals.

61. The optical communication system of claim 60 wherein the output means further includes a plurality of demodulators, each demodulator being connected to one of the tuning circuits and demodulating a corresponding one of the plurality of demodulated signals to produce an output signal containing the information content of the corresponding acoustic beam.

62. The optical communication system of claim 61 wherein the output means further includes a plurality of low noise amplifiers, each amplifier amplifying a different one of the plurality of demodulated signals prior to input of the demodulated signal to the corresponding one of the plurality of demodulators.

63. The optical communication system of claim 59 wherein the input means includes means for producing a plurality of continuous wave signals, each continuous wave signal having the frequency of one of the plurality of acoustic beams, and means for modulating each continuous wave signal by a separate data signal containing the information content of the corresponding acoustic beam, to produce a plurality of modulated signals.

64. The optical communication system of claim 63 wherein the input means combines the modulated signals to produce a drive signal in the acoustic frequency band, and includes means for producing the plurality of acoustic beams in response to the drive signal.

65. The optical communication system of claim 59 wherein the light source means includes means for collimating the laser light beam.

66. The optical communication system of claim 59 wherein the means for spatially combining the undiffracted and diffracted laser light beams includes collection lens receiving the undiffracted and diffracted laser light beams and producing the combined laser light beam.

67. A bidirectional optical communication system for communicating information between a first location and a second location, comprising:

transmission means for transmitting laser light between the first location and the second location;

first input means for producing a first acoustic beam modulated by first information and having a first acoustic beam frequency;

first light source means for producing a first continuous wave laser light beam at a substantially fixed first optical frequency;

first modulation means for receiving the first acoustic beam and the first laser light beam and producing an undiffracted first laser light beam and a diffracted first laser light beam, the diffracted first laser light beam being frequency-shifted from the frequency of the undiffracted first laser light beam by the first acoustic beam frequency and being diffracted through a first angle that is dependent on the first acoustic beam frequency;

first means, at the first location, for spatially combining the undiffracted and diffracted first laser light beams to produce a first combined laser light beam, and directing the first combined laser light beam to the transmission means for transmission of the first combined laser light beam to the second location;

first output means, at the second location, for receiving the transmitted first combined laser light beam and demodulating the first diffracted laser light beam to produce a first demodulated signal having the first acoustic beam frequency and containing the first information content of the first acoustic beam;

second input means for producing a second acoustic beam modulated by second information and having a second acoustic beam frequency;

second light source means for producing a second continuous wave laser light beam at a substantially fixed second optical frequency;

second modulation means for receiving the second acoustic beam and the second laser light beam and producing an undiffracted second laser light beam and a diffracted second laser light beam, the diffracted second laser light beam being frequency-shifted from the frequency of the undiffracted second laser light beam by the second acoustic beam frequency and being diffracted through a second angle that is dependent on the second acoustic beam frequency;

second means, at the second location, for spatially combining the undiffracted and diffracted second laser light beams to produce a second combined laser light beam, and directing the second combined laser light beam to the transmission means for transmission of the second combined laser light beam to the first location; and second output means, at the first location, for receiving the transmitted second combined laser light beam and demodulating the second diffracted laser light beam to produce a second demodulated signal having the second acoustic beam frequency and containing the second information content of the second acoustic beam.

68. The bidirectional optical communication system of claim 67 wherein the first and second modulation means each includes an acousto-optic modulator.

69. The bidirectional optical communication system of claim 67 wherein the first and second light source means each includes a single laser diode operating in a continuous wave mode.

70. The bidirectional optical communication system of claim 69 wherein the laser diodes comprising the first and second light sources generate laser light beams at substantially the same frequency.

71. The bidirectional optical communication system of claim 67 wherein the first and second output means each includes a single photodiode.

72. The bidirectional optical communication system of claim 71 wherein the first and second output means further each includes a tuning circuit which is connected to the corresponding photodiode and tuned to the first or second acoustic beam frequency to produce the first or second demodulated signal.

* * * * *

UNITED STATES PATENT AND TRADEMARK OFFICE
CERTIFICATE OF CORRECTION

PATENT NO. : 5,146,358

DATED : September 8, 1992

INVENTOR(S) : William M. Brooks

It is certified that error appears in the above-identified patent and that said Letters Patent is hereby corrected as shown below:

In column 16, claim 56, line 11, please delete "demodulated" and substitute therefor -- demodulates --.

Signed and Sealed this

Second Day of November, 1993

Attest:

BRUCE LEHMAN

Attesting Officer

Commissioner of Patents and Trademarks